United States Patent
Hundemer et al.

(10) Patent No.: US 10,225,489 B2
(45) Date of Patent: Mar. 5, 2019

(54) USE OF WIRELESS CONNECTION LOSS TO FACILITATE IDENTIFYING AND RECORDING VIDEO CAPTURE LOCATION

(71) Applicant: Tribune Broadcasting Company, LLC, Chicago, IL (US)

(72) Inventors: Hank Hundemer, Bellevue, KY (US); Dana Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 52 days.

(21) Appl. No.: 15/417,773

(22) Filed: Jan. 27, 2017

(65) Prior Publication Data

US 2017/0142350 A1 May 18, 2017

Related U.S. Application Data

(63) Continuation of application No. 14/288,027, filed on May 27, 2014, now Pat. No. 9,648,230.

(51) Int. Cl.
*H04N 5/28* (2006.01)
*H04N 5/232* (2006.01)
(Continued)

(52) U.S. Cl.
CPC ............... *H04N 5/28* (2013.01); *G01S 5/02* (2013.01); *G06F 17/3082* (2013.01);
(Continued)

(58) Field of Classification Search
CPC ........... H04N 21/422; H04N 21/42207; H04N 21/42213; H04N 21/42215;
(Continued)

(56) References Cited

U.S. PATENT DOCUMENTS 6,611,742 B1    8/2003   Sand et al.
6,819,356 B1    11/2004  Yumoto
(Continued)

FOREIGN PATENT DOCUMENTS

EP    2 160 622      3/2010
JP    2002340577     11/2002
(Continued)

OTHER PUBLICATIONS

Machine English Translation of JP 2002-340577 A, dated Nov. 27, 2002 (Year: 2002).*

(Continued)

*Primary Examiner* — Nelson D. Hernández Hernández
(74) *Attorney, Agent, or Firm* — McDonnell Boehnen Hulbert & Berghoff LLP (57) ABSTRACT

A method and system to facilitate identifying and recording capture location of recorded video. A computing system determines multiple locations where a first wireless communication module and second wireless communication module have lost wireless connectivity with each other, as possible locations where a video camera may be used to capture video. The computing system then outputs, for presentation to the videographer or another user, a location-selection prompt that specifies the multiple determined locations as candidate capture-locations for a video that was captured by the video camera. Further, the computing system receives, in response to the location-selection prompt, data that represents a user selection of one of the specified locations. The computing system then records the selected location as capture-location metadata for the video, such as capture-location data integrated with the video or in a database relationship with the video.

20 Claims, 7 Drawing Sheets

(51) Int. Cl.
  *H04N 21/442*   (2011.01)
  *H04N 21/4363*  (2011.01)
  *H04N 21/4223*  (2011.01)
  *H04N 21/414*   (2011.01)
  *G11B 27/30*    (2006.01)
  *G11B 27/11*    (2006.01)
  *G01S 5/02*     (2010.01)
  *G06F 17/30*    (2006.01)
  *H04W 4/02*     (2018.01)
  *H04N 21/45*    (2011.01)
  *H04N 5/77*     (2006.01)
  *H04N 9/82*     (2006.01)
  *G08C 17/02*    (2006.01)

(52) U.S. Cl.
  CPC .............. *G08C 17/02* (2013.01); *G11B 27/11* (2013.01); *G11B 27/3027* (2013.01); *H04N 5/23222* (2013.01); *H04N 5/77* (2013.01); *H04N 9/8205* (2013.01); *H04N 21/41422* (2013.01); *H04N 21/4223* (2013.01); *H04N 21/43637* (2013.01); *H04N 21/44227* (2013.01); *H04N 21/4524* (2013.01); *H04W 4/02* (2013.01)

(58) Field of Classification Search
  CPC ......... H04N 21/42222; H04N 21/4223; H04N 21/4227; H04N 5/28; H04N 5/77; H04W 4/02
  See application file for complete search history.

(56) References Cited

U.S. PATENT DOCUMENTS

| | | | |
|---|---|---|---|
| 8,558,921 | B2 | 10/2013 | Walker et al. |
| 9,648,230 | B2 * | 5/2017 | Hundemer ......... H04N 5/23222 |
| 9,667,824 | B2 | 5/2017 | Hundemer |
| 2003/0227553 | A1 | 12/2003 | Mattis et al. |
| 2004/0126038 | A1 | 7/2004 | Aublant et al. |
| 2004/0217884 | A1 | 11/2004 | Samadani et al. |
| 2007/0249284 | A1 | 10/2007 | Asami |
| 2009/0295911 | A1 | 12/2009 | Grim, III et al. |
| 2009/0324137 | A1 | 12/2009 | Stallings et al. |
| 2010/0020175 | A1 | 1/2010 | Takada |
| 2010/0029326 | A1 | 2/2010 | Bergstrom et al. |
| 2010/0277615 | A1 | 11/2010 | Watazawa |
| 2011/0109769 | A1 * | 5/2011 | Bhatt ...................... H04N 5/77 348/231.5 |
| 2011/0113444 | A1 | 5/2011 | Popovich |
| 2011/0173196 | A1 | 7/2011 | Casaccia |
| 2011/0292230 | A1 | 12/2011 | Winters |
| 2011/0302130 | A1 | 12/2011 | Lee et al. |
| 2012/0046862 | A1 | 2/2012 | Griffin et al. |
| 2012/0210227 | A1 | 8/2012 | Lin |
| 2012/0283855 | A1 | 11/2012 | Hoffman et al. |
| 2014/0085485 | A1 | 3/2014 | Gavita et al. |
| 2014/0172355 | A1 | 6/2014 | Kawamoto |

FOREIGN PATENT DOCUMENTS

| | | |
|---|---|---|
| JP | 2002340577 A * | 11/2002 |
| JP | 2008191868 | 8/2008 |
| KR | 20050110897 | 11/2005 |
| KR | 2010010960 | 9/2010 |

OTHER PUBLICATIONS

International Preliminary Report on Patentability from International Application No. PCT/US2015/031794, dated Nov. 29, 2016.
International Search Report and Written Opinion from International Application No. PCT/US2015/031794, dated Aug. 25, 2015.

* cited by examiner

IN-TRANSIT SCENARIO

USE OF WIRELESS CONNECTION LOSS TO FACILITATE IDENTIFYING AND RECORDING VIDEO CAPTURE LOCATION

REFERENCE TO RELATED APPLICATION

This is a continuation of U.S. patent application Ser. No. 14/288,027, filed May 27, 2014, the entirety of which is hereby incorporated by reference. In addition, the entire disclosure of U.S. patent application Ser. No. 14/288,019, filed May 27, 2014, is also incorporated by reference.

BACKGROUND

Unless otherwise indicated herein, the materials described in this section are not prior art to the claims in this disclosure and are not admitted to be prior art by inclusion in this section.

In news production, it is common to have videographers capture video in the field and to transfer that video to a newsroom for use. In practice, the captured video could be transferred as a live video feed to the newsroom, where the video could be broadcast in real-time, edited, and/or stored for later use. Alternatively or additionally, the captured video could be stored and perhaps edited in the field and subsequently transferred to the newsroom for further processing, broadcast, and storage.

As a newsroom accumulates such captured videos, it would be useful for the videos to be indexed in a meaningful manner, to facilitate later searching for desired footage. One way to do this would be to record for each video an indication of location where the video was captured. Provided with such location information, news production personnel could then conveniently search through an archive of video data for video that was captured at a particular location. Unfortunately, however, given the fast-paced nature of typical news production, it may be difficult to reliably record such location information for captured video. Consequently, an improvement is desired.

SUMMARY

Disclosed herein is a method and system to facilitate identifying and recording capture location of video. The disclosed method and system can be usefully applied in the context of news production as discussed above, but can also apply in other contexts, such as to facilitate managing of personal or family video archives and/or managing of video recordings uploaded to social media systems or cloud storage systems for instance.

In news production, a videographer may move from location to location to capture video for various news stories. In practice, for instance, the videographer may travel in a motor vehicle such as a car or van to various locations, transporting a video camera and associated equipment, along with other news production staff. Once the videographer arrives at each location where the videographer is to capture video, the videographer would then typically exit the vehicle and remove the video camera, and operate the video camera to capture video at that location. Further, as noted above, the captured video could be transferred to a newsroom as a live feed, or the captured video could be stored and later uploaded to the newsroom for use.

The present disclosure leverages the fact that a videographer and video camera would typically exit the motor vehicle at each location where the videographer will use the video camera to capture video. In particular, the disclosure provides a mechanism for detecting locations where the videographer and/or video camera move sufficiently away from the motor vehicle, and deeming such locations to be candidate video-capture locations, so as to facilitate identification and recording of capture-location metadata.

In accordance with the disclosure, a computing system may detect instances of the videographer and/or video camera moving sufficiently away from the motor vehicle by detecting loss of short-range wireless connectivity between a wireless communication module at the vehicle and a wireless communication module carried with the videographer and/or video camera. In turn, when the videographer or other user is reviewing or processing a video captured by the video camera, the computing system may then present to the user a list of the locations where the wireless communication modules lost wireless connectivity with each other, and the computing system may receive from the user a selection of at least one of the presented locations as a capture location for the video. The computing system may then record that location as capture-location metadata for the video, such as by meta-tagging the video with the capture location and/or by recording the capture location in a database relationship with the video.

In one representative implementation, for instance, the motor vehicle that transports the videographer and video camera may be equipped with a low-power wireless communication module such as a BLUETOOTH radio, and the videographer may have a peer wireless communication module such as another BLUETOOTH radio in a cell phone that the videographer carries in a pocket. While the videographer is in the vehicle traveling from location to location, the vehicle's module may be wirelessly paired with the videographer's module. However, each time the videographer leaves the vehicle and moves a sufficient distance from the vehicle, possibly to shoot video, that wireless pairing would be lost. By tracking instances where the wireless pairing between the vehicle's module and the videographer's module lost their wireless pairing, and determining locations of those instances, a computing system could then conveniently present a list of the determined locations as a prompt for the videographer or other user to select a location to be recorded as capture-location metadata for a captured video.

Accordingly, in one respect, disclosed is a method that may be implemented by a computing system comprising at least one processing unit, at least one data storage, and program instructions stored in the at least one data storage and executable by the at least one processor. In accordance with the method, the computing system may determine a plurality of locations where a first wireless communication module and a second wireless communication module have lost wireless connectivity with each other. The computing system may then output a location-selection prompt specifying the determined plurality of locations as candidate capture-locations for a video captured by a video camera and may receive, in response to the prompt, data that represents a user selection of one of the specified locations. The computing system may then record the selected location as capture-location metadata for the captured video.

In another respect, disclosed is a method that may be carried out by such a computing system. The method may involve the computing system receiving a video captured by a video camera operated by a videographer and the computing system receiving, from a first device associated with the videographer, a set of location data that specifies a plurality of locations where the first device lost wireless connectivity with a second device. Further, the method may involve the computing system outputting a location-selection prompt specifying the plurality of locations, to allow user selection of one of the locations as a capture location of the received video. In addition, the method may involve the computing system receiving, in response to the location-selection prompt, a user selection of one of the locations specified by the location-selection prompt. In turn, the method may then involve the computing system recording the selected location as capture-location metadata for the received video.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Referring to the drawings, as noted above, FIG. 1 is a simplified block diagram depicting an example arrangement for implementing the present method. As shown, the example arrangement includes a video camera 12, a wireless communication system 14, a computing system 16, and a user 18. Although these components are shown as separate blocks, the components can be integrated together in any of a variety of ways. For instance, the computing system 16 could be integrated in whole or in part with the wireless communication system 14 and/or with the video camera, and a portion of the wireless communication system could be integrated with the video camera.

Figure 1:
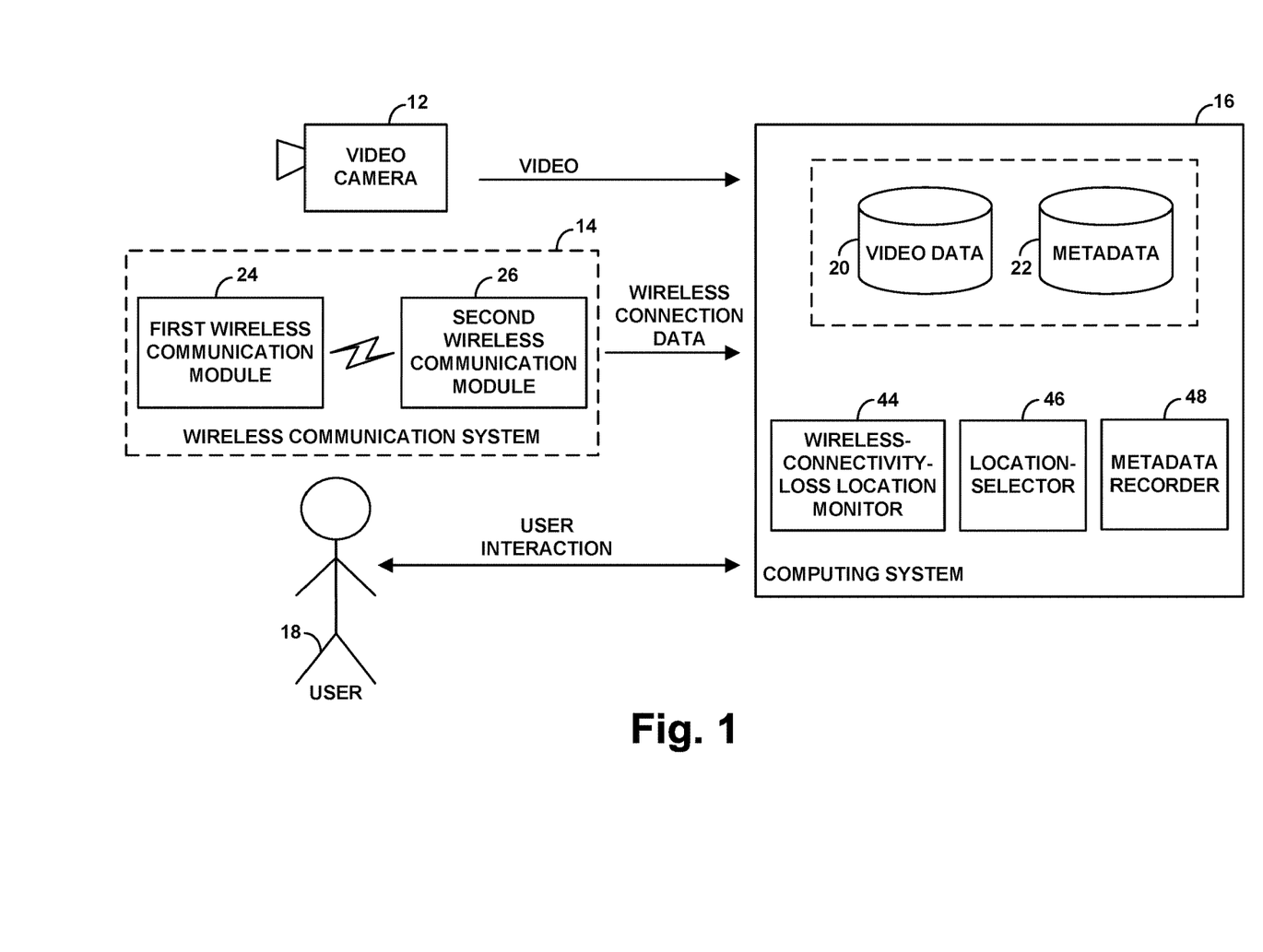
FIG. 1 is a simplified block diagram of an example arrangement for implementing the present method.

The user 18 may be a videographer or other person who operates the video camera 12 or may be another individual, such as another news production staff person for instance. Further, the computing system 16 may comprise one or more computing devices, such a portable computing devices and/or servers. In the arrangement shown, the computing system 16 is arranged to receive, or otherwise have access to, video captured by the video camera and to thus hold video data 20 representing the captured video. In addition, the computing system is arranged to hold metadata 22 for the video, with the metadata being integrated with the video as header data or the like, or stored separately but in a database relationship with the video.

In line with the discussion above, wireless communication system 14 is shown including a first wireless communication module 24 and a second wireless communication module 26. These wireless communication modules may be BLUETOOTH, radios or other short-range wireless communication devices (e.g., WIFI or ZIGBEE radios) that are arranged to wirelessly pair with each other when sufficiently close together, and thus to establish direct, peer-to-peer wireless connectivity with each other, but to lose that wireless connectivity when sufficiently far away from each other.

In practice, these wireless communication modules may be provided in a manner that reasonably associates their loss of wireless pairing with a possibility that the video camera 12 is being used to capture video. To facilitate this, one of the modules may be provided in or otherwise at a base object from which the video camera would typically or likely be moved when the video camera is going to be used to record video, and the other module may be provided in or otherwise at the video camera or with a person or object that would accompany the video camera when it is moved. That way, when the video camera or accompanying person or object moves sufficiently far away from the base object, the two wireless communication modules may lose their wireless pairing, justifying a conclusion that such movement may be at a location where the video camera is being used to capture video.

By way of example, as discussed above, one of these modules may be situated (disposed) in a vehicle that transports the video camera and videographer to various locations, and the other module may be provided in the video camera or in a cell phone or other device carried by the videographer who operates the video camera. That way, when the video camera and videographer are in the vehicle traveling from location to location, the two modules would be close together and wirelessly paired with each other, which may reasonably support a conclusion that the video camera is not being used to capture video. Whereas, each time the videographer takes the video camera out of the vehicle at a particular location and moves sufficiently far away from the vehicle, the two modules may lose their wireless pairing, which may reasonably support a conclusion that the video camera is possibly being used at that location to capture video.

Figure 2A:
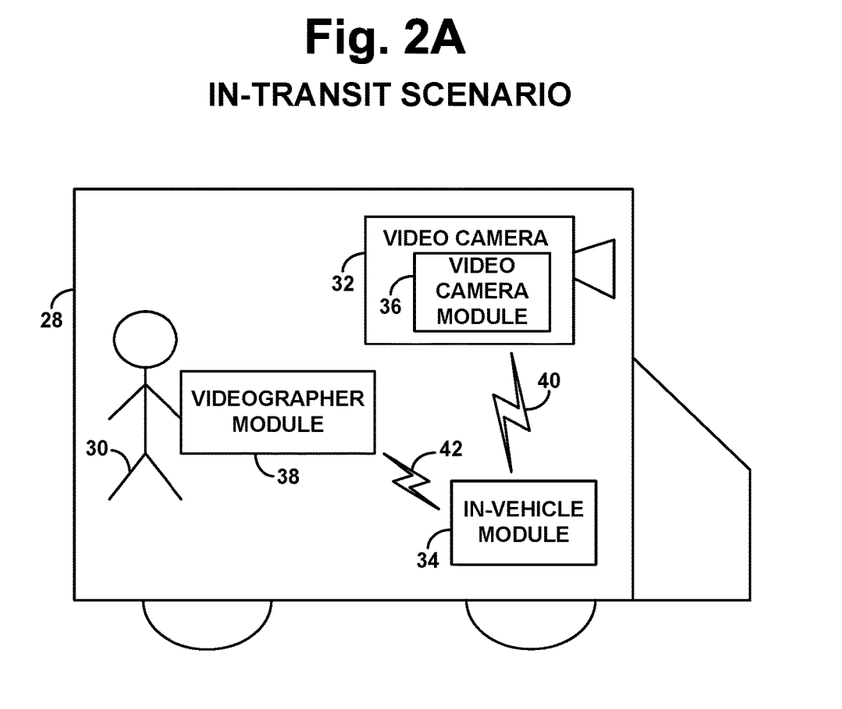
FIGS. 2A and 2B are additional illustrations of an example arrangement for implementing the method.
Figure 2B:
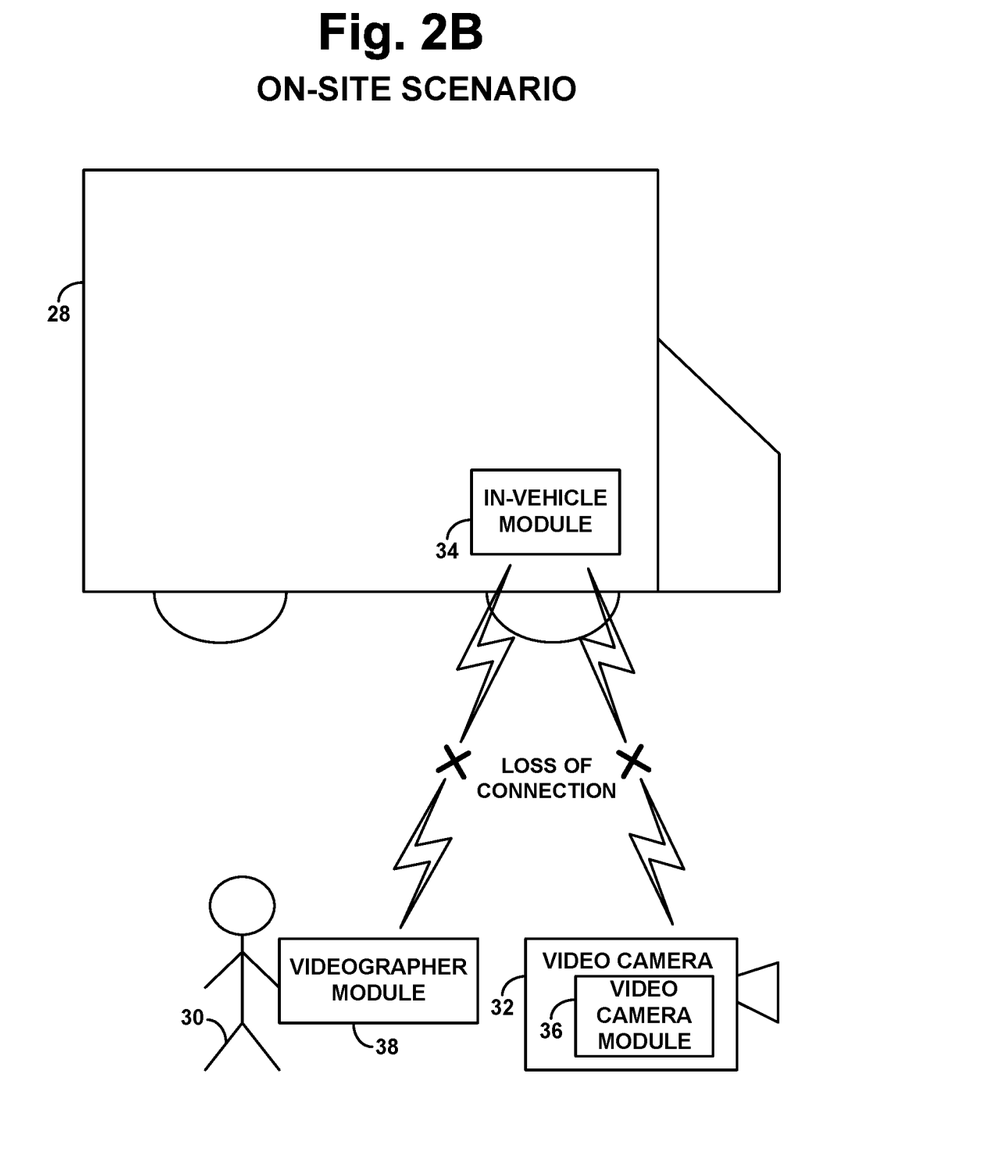

FIGS. 2A and 2B are simplified block diagrams illustrating this example arrangement. In particular, FIG. 2A depicts an in-transit scenario where a motor vehicle 28 is transporting a videographer 30 and a video camera 32, and FIG. 2B depicts an on-site scenario where the videographer 30 and video camera 32 have moved out of and away from the motor vehicle 28.

As shown in FIGS. 2A and 2B, the motor vehicle 28 includes an in-vehicle wireless communication module 34, such as a BLUETOOTH radio integrated with the vehicle, or perhaps provided in or otherwise at the vehicle specifically for purposes of the present method. Further, the video camera 32 includes a video camera wireless communication module 36, such as a BLUETOOTH radio integrated with the video camera or attached to or otherwise accompanying the video camera. In addition, the videographer 30 carries a videographer wireless communication module 38, such as a cell phone or other supplemental device that incorporates a BLUETOOTH radio for instance. In practice, just one of the video camera wireless communication module 36 and the videographer wireless communication module 38 may be provided, but FIG. 2 illustrates both.

With this example arrangement, as shown in the in-transit scenario of FIG. 2A, the video camera wireless communication module 36 is wirelessly paired with the in-vehicle wireless communication module 34, using conventional BLUETOOTH pairing for instance, thus providing wireless connectivity 40 between those two wireless communication modules. Further, the videographer wireless communication module 38 is wirelessly paired with the in-vehicle wireless communication module 34, thus providing wireless connectivity 42 between those two wireless communication modules as well. In the on-site scenario of FIG. 2B, however, the videographer 30 and video camera 32 have moved out of and sufficiently far away from the vehicle 28, possibly to facilitate use of the video camera to record video, and this movement away from the in-vehicle wireless communication module 34 results in loss of wireless connectivity 40 and loss of wireless connectivity 42 as shown.

Note also that there could be other reasons for loss of wireless connectivity between wireless communication modules 24 and 26 that could also reasonably represent the possibility that the video camera is being used to capture video. For instance, in the example arrangement where one module is in a vehicle that transports the video camera and videographer and the other module is with the video camera or videographer, it is possible that the in-vehicle module 34 may be powered by a power source of the vehicle and could lose power when the vehicle is powered down, such as when its ignition is turned off. In that situation, turning off the vehicle could result in powering down the in-vehicle module 34 and thus in loss of wireless connectivity between the in-vehicle module 34 and the other module. This too could reasonably justify a conclusion that the video camera may be used at that location to record video, as it may represent a scenario where the vehicle stops and is turned off to allow the videographer to exit the vehicle and record video.

Still further, the wireless communication modules could be provided in other arrangements such that their loss of wireless connectivity may reasonably represent the possibility that the video camera is being used to capture video, without necessarily involving a motor vehicle. For instance, one wireless communication module could be provided at equipment associated with storage or transport of the video camera, such as at a carrying case or docking station, and the other wireless communication module could be provided at equipment associated with use of the video camera, such as at the video camera itself or at a tripod or the like. That way, moving the equipment that is associated with use of the video camera sufficiently far away from the equipment that is associated with storage or transport of the video camera could justify a conclusion that the video camera may be used to record video. Other examples are possible as well.

Further, note that mere loss of wireless pairing between the wireless communication modules 24 and 26 may not necessarily mean that the video camera is being used at that location to capture video. There could be locations where the modules lose their wireless pairing but where the video camera is not used to capture video. For instance, in the example arrangement where one module is in a vehicle that transports the video camera and videographer and the other module is in a cell phone carried by the videographer, there could of course be locations where the videographer exits and moves away from the vehicle for a lunch break, at the end of a day, or at another time when the videographer does not remove the camera and/or does not use the camera to record video. Further, in the example arrangement where one module is in the vehicle and the other module is in the video camera, there could be locations where the video camera is taken away from the vehicle for reasons other than to record video, such as for maintenance or storage. Nevertheless, locations where the two modules lose their wireless pairing may be considered at least "possible" or "candidate" video-capture locations, on grounds that there is a reasonable possibility that at such locations the video camera may be used to capture video.

In accordance with the present disclosure, computing system 16 may thus function to determine locations where these wireless communication modules lose wireless connectivity with each other, and to treat those locations as candidate capture-locations for a video captured by the video camera 12. In particular, the computing system may determine a plurality of such candidate locations for a designated time period, such as a day or other period of time when the videographer was traveling from location to location, and the computing system may then prompt a user to select one of the determined locations as a capture location for a video captured by the video camera. In turn, the computing system may then record the selected location as capture-location metadata for the video.

As such, FIG. 1 conceptually illustrates the computing system 16 as including a wireless-connectivity-loss location monitor 44, a location selector 46, and a metadata recorder 48, which could be provided as separate or integrated modules by at least one programmed processor or in another form. In this arrangement, the wireless-connectivity-loss location monitor 44 functions to determine locations where the first wireless communication module 24 and the second wireless communication module 26 have lost wireless connectivity with each other. The location selector 46 then functions to provide a location-selection prompt specifying locations corresponding with the determined locations where the modules lost wireless connectivity, and to receive input representing user selection of one of the specified locations as a capture location of a video captured by the video camera. Further, the metadata recorder 48 functions to record the selected location as a capture location of the captured video, such as by recording corresponding location data in the video or video file or in a database relationship with the video.

Figure 3:
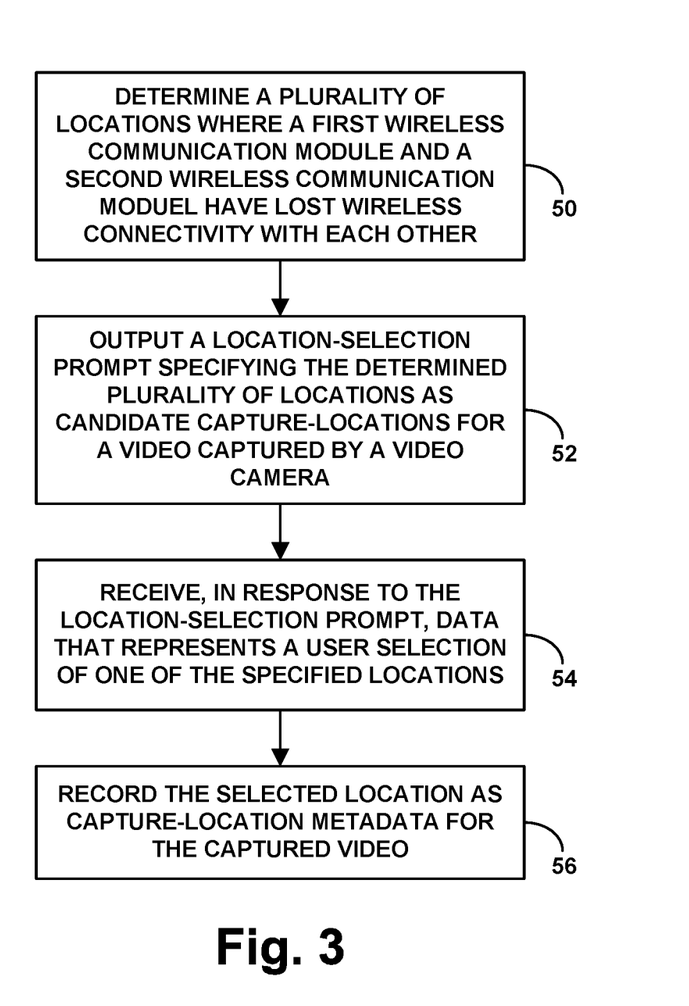
FIG. 3 is a flow chart depicting example functions that can be carried out in accordance with the method.

FIG. 3 is next a flow chart depicting functions that can be carried out by a computing system such as this, to identify and record capture location of a video captured by the video camera in accordance with an example implementation of the present method.

As shown in FIG. 3, at step 50, the computing system determines a plurality of locations where a first wireless communication module and a second wireless communication module have lost wireless connectivity with each other. At step 52, the computing system then outputs a location-selection prompt specifying the determined plurality of locations as candidate capture-locations for a video captured by a video camera. At step 54, the computing system then receives, in response to the location-selection prompt, data that represents a user selection of one of the specified locations. In turn, at step 56, the computing system then records the selected location as capture-location metadata for the captured video.

In this method, the step of determining the plurality of locations where the first wireless communication module and second wireless communication module have lost wireless connectivity with each other could be carried out by a portion of the computing system that incorporates or is interconnected with or otherwise associated with one of the wireless communication modules.

For instance, the computing system may include a computing device, such as a portable computer or cell phone, having one of the wireless communication modules as an integrated component such as an integrated BLUETOOTH radio for instance, and further having a location-determination module such as a Global Positioning System (GPS) module or the like. Such a computing device could then include a standard network management function that manages and monitors the device's wireless connection status, such as its BLUETOOTH connections. Further, the computing device could be configured or programmed to wirelessly pair with the other wireless communication module, based on an identity of the other wireless communication module. For purposes of the present method, the computing device may then further be programmed to detect instances when its wireless pairing with the other wireless communication module is lost, and at each such instance to determine and record its geographic location, such as its latitude/longitude coordinates, along with a timestamp. Thus, the computing device, as part of the computing system, would establish a record of geographic locations where the first wireless communication device has lost wireless connectivity with the second wireless communication device.

Alternatively or additionally, the step of determining the plurality of locations where the wireless communication modules have lost wireless connectivity with each other may involve receiving location data that indicates the plurality of locations where the wireless communication modules have lost wireless connectivity with each other and reading the received location data to determine the plurality of locations. In practice, for instance, a computing device that is integrated with or that accompanies one of the wireless communication modules may be configured to detect each such instance of loss of wireless connectivity, to responsively determine its geographic location for each such instance, and to report the determined locations and corresponding timestamps to a separate computing device that is part of the computing system. By way of example, a cell phone carried by the videographer may detect each such instance and determine its geographic location corresponding to each such instance, and may report the determined geographic locations with timestamps to a remote server, such as a newsroom server for instance. That remote server may then read the reported location data to determine the locations where the wireless communication modules lost wireless connectivity with each other.

In turn, the steps of outputting the location-selection prompt specifying the determined plurality of locations as candidate capture-locations for a video captured by a video camera and receiving in response to the location-selection prompt the data representing user selection of one of the specified locations could involve interaction with the videographer or another user. For instance, this could occur when the videographer or another user is reviewing video footage captured by the camera, such as in the field or at a newsroom. At that time, the user could enter into the computing system a relevant time range, or the computing system could automatically select a relevant time range, such as the past day or week for instance, and the computing system may then present the user with a prompt specifying locations representing the locations where the wireless communication modules were deemed to have lost wireless connectivity with each other in that time period.

In practice, the computing system may interact with the user through a graphical user interface, such as through an Hypertext Markup Language (HTML) interface for instance. Through that interface, the computing system may output a representation of the video captured by the video camera and may allow a user to view and select all or a portion of the video as the video recording at issue. For instance, the interface may incorporate a media player that plays the captured video and may include controls selectable by the user to cause the computing system to play designated portions of the video and to receive user input demarcating start and end points defining the video recording at issue.

Further, through the interface, the computing system may prompt the user to designate a relevant time period for consideration of candidate locations, such as by presenting a calendar and/or clock object through which the user can designate beginning and end times for the time period at issue. The computing system may then present on the interface the prompt specifying the locations representing determined locations where the wireless communication modules lost wireless connectivity with each other in that time period and may receive the user selection of one of the specified locations.

Optimally, the location prompt will specify the locations in a manner that is readily understandable by the user, rather than as geographic location coordinates. Thus, if the computing system has stored the set of locations as latitude/longitude coordinates, the computing system may refer to mapping data to programmatically translate those location coordinates into a more user-understandable form. By way of example, the computing system could translate the location coordinates into a graphical map of a region with pin-markers, balloons, or other graphical objects illustrating the various determined locations on the map, and the computing system may present the resulting map graphic as a graphical user interface and receive input representing user clicking or other selection of one of the illustrated locations. Further, as another example, the computing system could translate the location coordinates to city and street addresses, names of points of interest, or other user-understandable form and could present a drop-down list from which the user could then readily select one of the specified locations.

Once the computing system thus receives from the user a selection of one of the specified locations, the computing system may then record the selected location as capture-location metadata for the video recording at issue. As noted above, the computing system may do this in various ways. By way of example, the computing system may record the selected location as capture-location metadata within a file representing the video itself, or separately but in a database relationship with the video. For instance, the computing system may store a data file representing the video recording at issue and may write to a header or other portion of that data file a specification of the selected location as a capture location of the video. Alternatively or additionally, the computing system may store a data file representing the video recording at issue and may write to a database a relationship between that data file and the capture location. In either case, recording the capture location of the video may then allow subsequent searching for the video based on the recorded capture location.

As noted above, the computing system that carries out these functions could be provided as a single computing device or distributed among multiple devices. Further, part or all of the computing system could be co-located with the video camera and videographer or could be provided remotely, possibly accessible over a web interface or the like.

In one example implementation, for instance, the computing system could be provided fully in the form of one or more computing devices local to the videographer and the video camera. For instance, the videographer may have a cell phone that the videographer keeps in his or her pocket and perhaps a portable computer (e.g., computer server) such as a notebook computer or tablet computer that the videographer brings with to news locations, and the cell phone and portable computer may be programmed to run one or more applications that cause them to carry out functions described herein. Further, the cell phone, portable computer, and video camera may be configured to communicate with each other through wired and/or wireless links in accordance with any agreed protocol.

In that arrangement, the videographer's cell phone may be configured to wirelessly pair with an in-vehicle wireless communication module and may run a program application that causes the cell phone to determine and record its geographic location each time the cell phone loses its wireless pairing with the in-vehicle wireless communication module. Further, the cell phone may transmit to the portable computer location data representing those determined locations and corresponding timestamps, and a program application running on the computer may receive and record the reported locations and timestamps.

In addition, the videographer's cell phone and/or portable computer may receive from the video camera video data representing a video captured by the video camera. For instance, through communication with the video camera, the cell phone and/or portable computer may receive a data file representing the captured video or may receive a real-time video stream as the video camera captures video. The cell phone and/or portable computer may then present the video to a user via a display screen, receive user selection of all or a portion of the video, and record in data storage the selected video as the captured video at issue.

Still further, the cell phone and/or portable computer may receive from the user a designation of a relevant time period and may present to the user a location-selection prompt specifying the locations representing determined locations where the wireless communication modules lost wireless connectivity with each other in that time period and receive from the user a selection of one of the specified locations as capture location for the video at issue. In turn, the cell phone and/or portable computer may then record the selected location as capture-location metadata for the video, and/or may transmit to another computing device data that correlates the capture location with the video.

Figure 4:
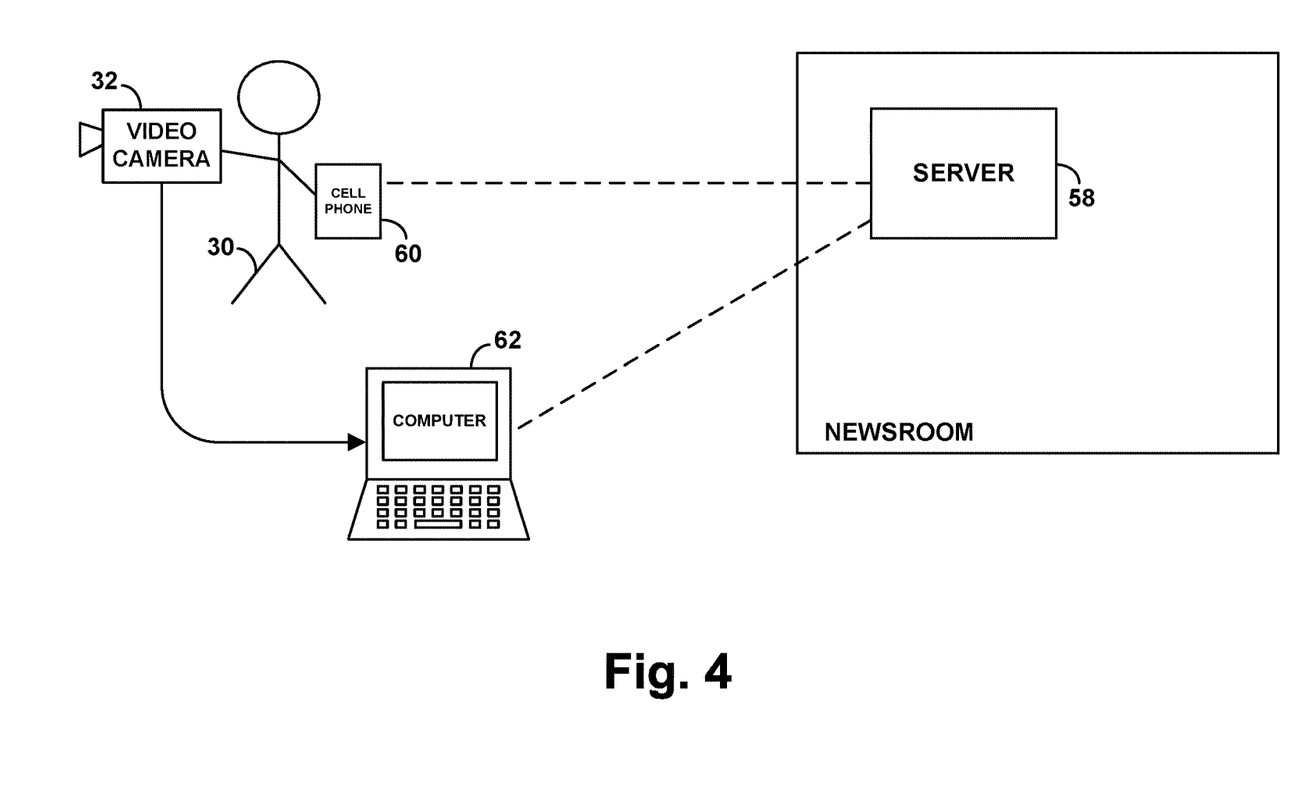
FIG. 4 is a simplified block diagram of another example arrangement for implementing the method.

In another example implementation, illustrated by FIG. 4, the computing system could include a remote server 58, such as a newsroom server, a supplemental device such as a cell phone 60 or other computing device carried by the videographer, and a portable computer 62 that the videographer uses in the field to interact with the remote server.

In that arrangement, the cell phone may be configured to wirelessly pair with an in-vehicle wireless communication module and may run a program application that causes the cell phone to determine and record its geographic location each time the cell phone loses its wireless pairing with the in-vehicle wireless communication module. At some point after the videographer uses the video camera to capture video, the videographer may then use the portable computer to log into the remote server and, through a web interface or other interface provided by the remote server, to upload the resulting video data to the remote server. Further, the remote server may obtain from the cell phone the location data representing the determined locations where the wireless communication modules lost wireless connectivity with each other and may carry out other functions described herein, including providing the location-prompt, receiving user selection of a capture location, and recording the selected location as capture-metadata for a designated video recorded by the video camera.

In this scenario, when the videographer (as operator of the video camera) logs into the remote server, the remote server may determine an identity of the videographer based on that login, such as based on a username provided by the videographer, and the remote server may then programmatically correlate that videographer identity with an identity of the videographer's cell phone, such as a phone number or other address at which the server can remotely access the cell phone.

The remote server may then establish a communication with that particular cell phone, or make use of established communication with that particular cell phone, and request and receive from the cell phone a report of the determined locations of lost wireless connectivity. For instance, the remote server may communicate with the cell phone through an existing data session that the server has with the cell phone, or the remote server may communicate with the cell phone in other ways, such as by Short Message Service messaging (e.g., Wireless Application Protocol push messaging), and may programmatically transmit to the cell phone a request for the location data representing the determined locations of lost wireless connectivity and receive from the cell phone, in response to the request, the location data. Through this process, the cell phone may be considered the device that determines the locations of lost wireless connectivity. Alternatively, the remote server may be considered the device that determines the locations of lost wireless connectivity, by receiving the location-data that specifies the locations and reading that received data.

Further, through the web interface or other interface that the remote server has with the videographer, the remote server may output for presentation to the videographer the uploaded video and receive from the videographer a selection of all or part of the video as the video at issue and of a relevant time period.

In addition, through the interface, the remote server may output for presentation to the videographer a location-selection prompt specifying locations representing the locations of lost wireless connectivity determined for that time period, and receive from the videographer a selection of at least one of the specified locations as a capture location of the video at issue. In practice, this output of the location-selection prompt could be output of an HTML page or the like that defines the prompt, and the videographer's portable computer may render that page for presentation to the videographer. Through interaction with that rendered page, the videographer may then select one of the specified locations, and the portable computer may responsively transmit to the remote server, in an HTTP POST message for instance, data that represents the user selected capture location.

In turn, the remote server may then record the selected location as capture-location metadata for the video at issue. In particular, the remote server may record the selected location as capture-location metadata in a video file representing the video at issue, and/or the remote server may record the selected location as capture-location metadata in a database relationship with such a video file.

Figure 5:
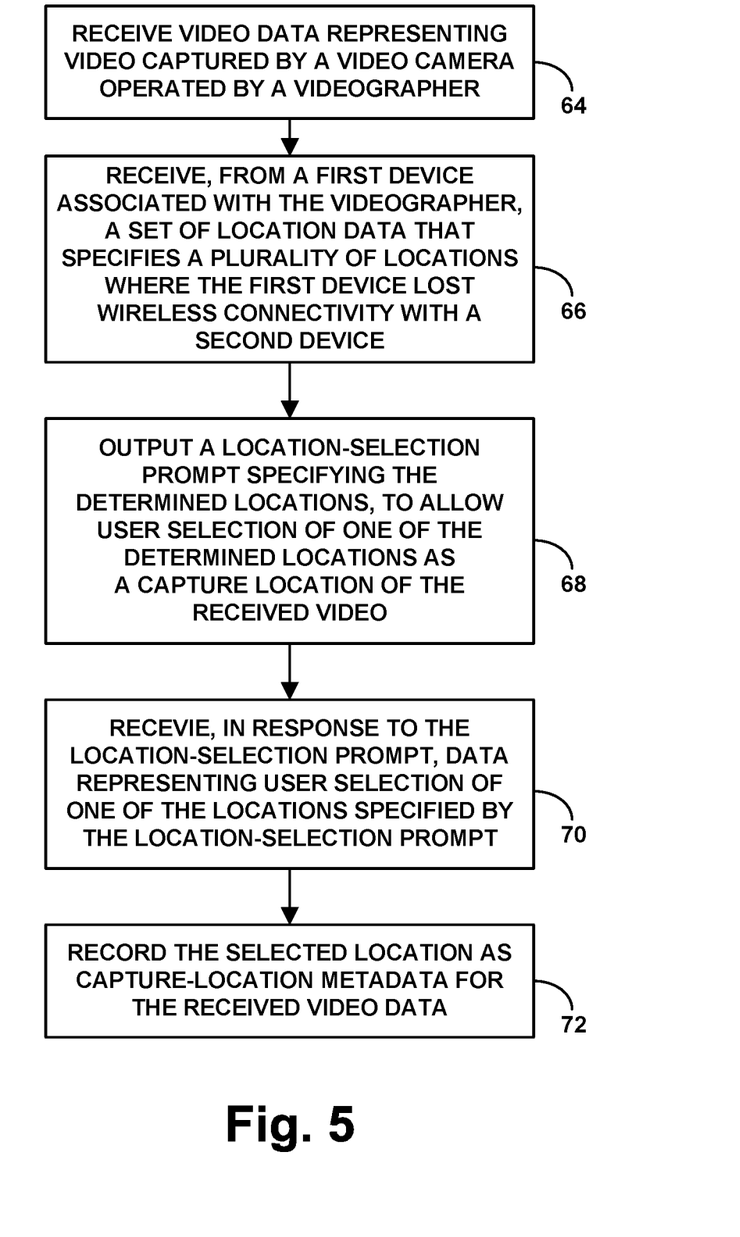
FIG. 5 is another flow chart depicting example functions that can be carried out in accordance with the method.

FIG. 5 is next another flow chart depicting functions that can be carried out in accordance with an example implementation, to identify and record capture location of a video captured by the video camera. Although various steps are shown in a particular order in this figure, it will be understood that variations are possible. For instance, certain steps could be carried out in different order or in parallel with other steps.

As shown in FIG. 5, at step 64, a computing system receives video data representing video captured by a video camera operated by a videographer. Further, at step 66, the computing system receives, from a first device associated with the videographer, such as a cell phone or other device registered to and thus likely to be carried by the videographer, a set of location data that specifies a plurality of locations where the first device lost wireless connectivity with a second device.

In line with the discussion above, for instance, the computing system may receive the video data through a first communication session with the videographer, such as through a communication session with a portable computer operated by the videographer. Responsive to that first communication session being with the videographer, the computing system may then determine which first device is associated with the videographer and may establish a second communication session with the determined first device and receive the location data from the first device through that established second communication session.

At step 68, the computing system then outputs a location-selection prompt specifying the determined locations, to allow user selection of one of the determined locations as a capture location of the received video. Further, at step 70, the computing system receives, in response to the location-selection prompt, data representing user selection of one of the locations specified by the location-selection prompt.

For instance, again in line with the discussion above, the computing system may output the location-selection prompt in the first communication session with the videographer. Further, the computing system may then receive in the first communication session the data representing the user selection of one of the locations specified by the location-selection prompt.

At step 72, the computing system then records the selected location as capture-location metadata for the received video data, such as by recording the selected location as capture-location metadata in the video data and/or by recording the selected location as capture-location metadata separate from the video data but in a database relationship with the video data.

Figure 6:
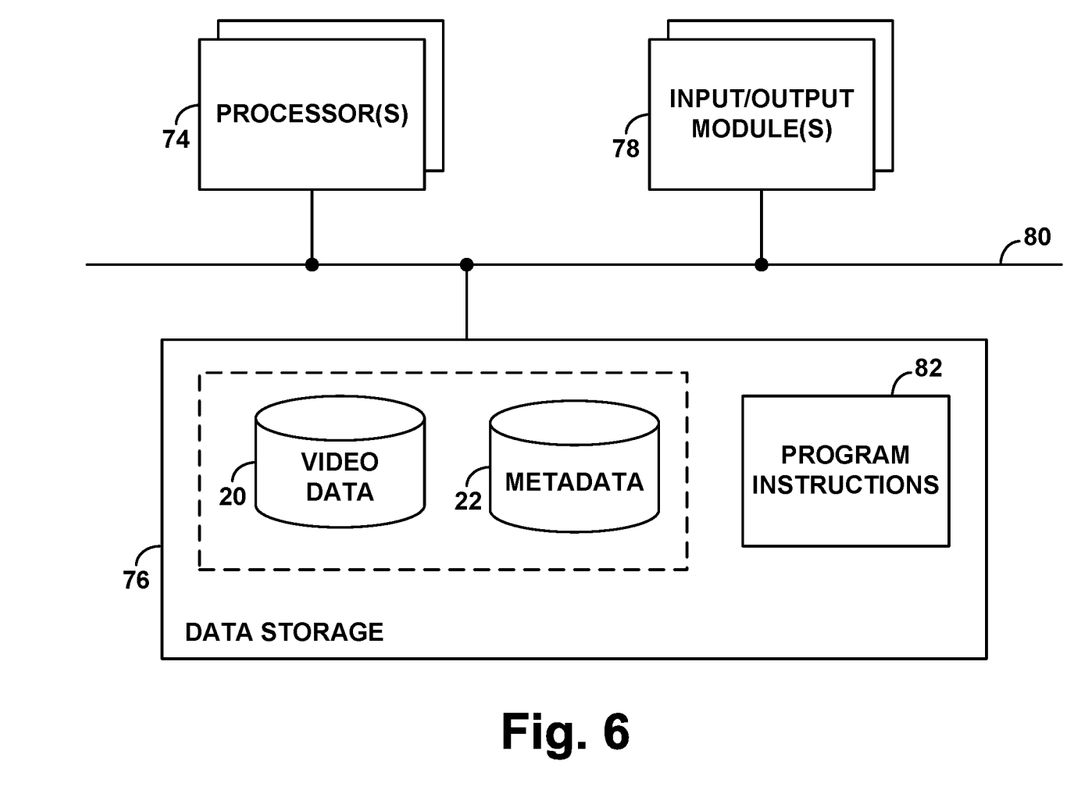
FIG. 6 is a simplified block diagram of an example computing system for implementing the method.

Finally, FIG. 6 is a simplified block diagram depicting components of an example computing system operable to carry out the present method. As shown in the figure, the example computing system includes one or more processors 74, one or more data storage units 76, and one or more input/output modules 78, all of which may be communicatively linked together by a system bus, network, and/or other connection mechanism 80.

Processor(s) 74 may comprise one or more general purpose processors (e.g., microprocessors) and/or one or more special purpose processors (e.g., application specific integrated circuits). Data storage unit(s) 76 may then comprise one or more volatile and/or non-volatile storage units, such as magnetic, optical, or flash storage, and may be integrated in whole or in part with processor(s) 74. Further, input/output module(s) 78 may comprise one or more user interface modules for providing output to a user and receiving input from a user, and/or one or more communication interface modules such as wireless or wired network communication interfaces to facilitate communication with one or more other devices as described above.

As shown, data storage unit(s) 76 hold video data 20 and metadata 22 as discussed above. Further, data storage unit(s) hold program instructions 82, which are executable by processor(s) 74 to carry out various functions described herein. For instance, the program instructions may be executable by the processor(s) to (i) determine a plurality of locations where a first wireless communication module and a second wireless communication module have lost wireless connectivity with each other, (ii) output a location-selection prompt specifying the determined plurality of locations as candidate capture-locations for a video captured by the video camera, (iii) receive, in response to the location-selection prompt, data that represents a user selection of one of the specified locations, and (iv) record the selected location as capture-location metadata for the captured video.

Exemplary embodiments have been described above. Those skilled in the art will understand, however, that changes and modifications may be made to these embodiments without departing from the true scope and spirit of the invention.

What is claimed is:

1. A method comprising:
using a loss of wireless connectivity that occurred between a first wireless communication module and a second wireless communication module as a basis to determine by a computing system a capture-location for a video captured by a video camera, wherein the computing system comprises at least one processor, wherein the first wireless communication module is disposed in a supplemental device associated with an operator of the video camera, and wherein using the loss of wireless connectivity that occurred between the first wireless communication module and the second wireless communication module as a basis to determine the capture-location for the video captured by the video camera comprises (i) identifying the supplemental device based on an identity of the operator of the video camera, (ii) based on the identifying of the supplemental device, requesting from the identified supplemental device the capture-location, and (iii) receiving from the supplemental device, in response to the requesting, the capture-location as a location where the first wireless communication module and second wireless communication module lost wireless connectivity with each other; and
recording by the computing system the determined capture-location as capture-location metadata for the captured video.

2. The method of claim 1, further comprising:
outputting the determined capture-location as a candidate capture-location for the captured video; and
responsive to the outputting, receiving user input indicating that the candidate capture-location is the capture-location for the captured video,
wherein the recording of the determined capture-location as capture-location metadata for the captured video occurs after receiving the user input.

3. The method of claim 2, wherein the second wireless communication module is disposed in a motor vehicle that transports the video camera.

4. The method of claim 3, wherein the computing system further comprises a server, the method further comprising:
receiving, by the server, video data representing the video captured by the video camera; and
wherein receiving from the identified supplemental device the capture-location comprises the server receiving from the identified supplemental device location data representing the capture-location,
wherein outputting the determined capture-location as the candidate capture-location for the captured video comprises the server outputting a prompt specifying the determined capture-location, and
wherein receiving user input indicating that the candidate capture-location is the capture-location for the captured video comprises the server receiving data representing the user input in response to the prompt, indicating that the candidate capture-location is the capture-location for the captured video.

5. The method of claim 4,
wherein requesting from the identified supplemental device the capture-location comprises transmitting from the server to the identified supplemental device a location-request; and
wherein receiving from the identified supplemental device the capture-location comprises receiving by the server from the identified supplemental device, in response to the location-request, the capture-location as the location where the first wireless communication module and second wireless communication module lost wireless connectivity with each other.

6. The method of claim 3, wherein the motor vehicle is a news vehicle, and wherein the captured video is news video.

7. The method of claim 3, wherein the supplemental device associated with the operator of the video camera is a cell phone.

8. The method of claim 1, wherein the computing system comprises the supplemental device, wherein the supplemental device determines that the first wireless communication module and second wireless communication module lost wireless connectivity with each other.

9. The method of claim 1, further comprising detecting that the first wireless communication module and the second wireless communication module lost wireless connectivity with each other at the capture-location, wherein detecting that the first wireless communication module and the second wireless communication module lost wireless connectivity with each other at the capture-location comprises:
  detecting that first wireless communication module and the second wireless communication module lost direct, peer-to-peer wireless connectivity with each other at the capture-location.

10. The method of claim 1, further comprising detecting that the first wireless communication module and the second wireless communication module lost wireless connectivity with each other at the capture-location, wherein detecting that the first wireless communication module and the second wireless communication module lost wireless connectivity with each other at the capture-location comprises:
  receiving location data specifying the capture-location as the location where the first wireless communication module and the second wireless communication module lost wireless connectivity with each other.

11. The method of claim 1, further comprising receiving into the computing system video data representing the video captured by the video camera, wherein recording by the computing system the determined capture-location as capture-location metadata for the captured video comprises a function selected from the group consisting of (i) recording the determined capture-location as capture-location metadata in the video data and (ii) recording the determined capture-location as capture-location metadata separate from the video data but in a database relationship with the video data.

12. A method comprising:
  receiving, into a computing system, a video captured by a video camera operated by a videographer, wherein the computing system comprises at least one processor, wherein receiving the video comprises receiving the video through a first communication session with the videographer; and
  using loss of wireless connectivity that occurred between a first device and a second device as a basis to determine a capture-location for the video captured by the video camera, wherein the first device is associated with the videographer, and wherein using loss of wireless connectivity that occurred between the first device and the second device as a basis to determine the capture-location for the video captured by the video camera includes (i) receiving, into the computing system, from the first device, location data that specifies a location where the first device lost wireless connectivity with a second device, wherein receiving the location data from the first device associated the videographer comprises (a) responsive to the first communication session being with the videographer, identifying the first device associated with the videographer and, based on the identifying, establishing a second communication session with the first device, and (b) receiving the location data from the first device through the established second communication session, (ii) outputting, by the computing system, a specification of the location as candidate capture-location for the received video, and (iii) receiving, by the computing system, in response to the outputting, user input indicating that the candidate capture-location is capture-location for the received video; and
  after using loss of wireless connectivity between the first device and the second device as a basis to determine the capture-location for the video captured by the video camera, recording by the computing system the capture-location as capture-location metadata for the received video.

13. The method of claim 12,
wherein outputting the specification comprises outputting the specification in the first communication session, and
wherein receiving the user input indicating that the candidate capture-location is the capture-location for the received video comprises receiving, in the first communication session, data representing the user input.

14. The method of claim 12, wherein the first device is a cell phone.

15. The method of claim 14, wherein the second device comprises a wireless communication module disposed at a motor vehicle, wherein the cell phone and wireless communication module wirelessly pair with each other when the cell phone and wireless communication module are sufficiently close to each other, and wherein the location is a location where the cell phone moved so far away from the motor vehicle that the cell phone and wireless communication module lost wireless pairing with each other.

16. The method of claim 12, further comprising storing by the computing system the video as a digital video file,
wherein recording, by the computing system, the capture-location as capture-location metadata for the received video data comprises a function selected from the group consisting of (i) recording the capture-location as capture-location metadata in the digital video file and (ii) recording the capture-location as capture-location metadata separate from the digital video file but in a database relationship with the digital video file.

17. A computing system comprising:
at least one processor;
at least one data storage; and
program instructions stored in the at least one data storage and executable by the at least one processor to carry out functions comprising:
using loss of wireless connectivity that occurred between a first wireless communication module and a second wireless communication module as a basis to determine a capture-location for a video captured by a video camera, wherein the first wireless communication module is disposed in a supplemental device associated with a videographer who operates the video camera, and using loss of wireless connectivity that occurred between the first wireless communication module and the second wireless communication module as a basis to determine the capture-location for the video captured by the video camera comprises (i) identifying the supplemental device based on an identity of the videographer who operates the video camera (ii) based on the identifying of the supplemental device, requesting from the identified supplemental device the capture-location and (iii) receiving from the supplemental device, in response to the requesting, the capture-location as a location where the first wireless communication module and second wireless communication module lost wireless connectivity with each other, and recording the determined capture-location as capture-location metadata for the captured video.

18. The computing system of claim 17, wherein the computing system comprises the supplemental device separate from the video camera, and wherein the supplemental device detects that the first wireless communication module and the second wireless communication module lost wireless connectivity with each other at the capture-location.

19. The computing system of claim 17, wherein recording the determined capture-location as capture-location metadata for the video captured by the video camera comprises a function selected from the group consisting of (i) integrating the capture-location metadata with the video and (ii) recording the capture-location metadata separate from the video but in a database relationship with the video.

20. The computing system of claim 17, wherein the supplemental device is a cell phone.

* * * * *